(12) United States Patent
Lee et al.

(10) Patent No.: US 12,718,407 B2
(45) Date of Patent: Aug. 25, 2026

(54) APPARATUS FOR CONTROLLING VEHICLE AND METHOD THEREOF

(71) Applicants: Hyundai Motor Company, Seoul (KR); Kia Corporation, Seoul (KR)

(72) Inventors: Jung Hyun Lee, Seoul (KR); Dong Hoon Koo, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 212 days.

(21) Appl. No.: 18/773,761

(22) Filed: Jul. 16, 2024

(65) Prior Publication Data

US 2025/0182323 A1 Jun. 5, 2025

(30) Foreign Application Priority Data

Dec. 4, 2023 (KR) ........................ 10-2023-0173604

(51) Int. Cl.
*G06T 7/73* (2017.01)
*G06T 7/246* (2017.01)
*G06T 7/277* (2017.01)

(52) U.S. Cl.
CPC ................ *G06T 7/74* (2017.01); *G06T 7/248* (2017.01); *G06T 7/277* (2017.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 9,733,346 | B1 * | 8/2017 | Jang | G01S 11/14 |
| 11,667,289 | B2 * | 6/2023 | Kim | B60R 11/04 701/41 |
| 2006/0256198 | A1 * | 11/2006 | Nishiuchi | G06T 7/536 348/148 |
| 2021/0390726 | A1 * | 12/2021 | Filippov | G06T 7/70 |
| 2023/0249674 | A1 * | 8/2023 | Omohundro | B60G 17/0195 |

FOREIGN PATENT DOCUMENTS

| | | | |
|---|---|---|---|
| WO | WO-2024005858 A2 * | 1/2024 | G01S 17/931 |

* cited by examiner

*Primary Examiner* — Tyler W. Sullivan
(74) *Attorney, Agent, or Firm* — Slater Matsil, LLP

(57) ABSTRACT

A vehicle control apparatus may include cameras, a memory, and a processor. The processor may identify matching between a first image obtained by a first camera, from among images and templates based on obtaining the images through the cameras, may obtain a first pitch angular velocity of the first camera based on matching the first image and at least one of the templates, may obtain a second pitch angular velocity of a second camera based on at least one of a line included in a second image obtained by the second camera, from among the images, or a vanishing point of the second image, or any combination thereof, and may identify a posture of a vehicle by using one of the first pitch angular velocity or the second pitch angular velocity based on a difference between the first pitch angular velocity and the second pitch angular velocity.

20 Claims, 12 Drawing Sheets

APPARATUS FOR CONTROLLING VEHICLE AND METHOD THEREOF

CROSS-REFERENCE TO RELATED APPLICATIONS

This application claims the benefit of Korean Patent Application No. 10-2023-0173604, filed on Dec. 4, 2023, which application is hereby incorporated herein by reference.

TECHNICAL FIELD

The present disclosure relates to a vehicle control apparatus and a method thereof for determining a vehicle posture.

BACKGROUND

Various studies are being conducted to identify a posture of vehicle by using various sensors to assist vehicle driving.

In particular, while the vehicle is operating in a driving assistance mode or an autonomous driving mode, there is a need to accurately identify the posture of vehicle by using various sensors (e.g., a camera, a gyro sensor, and/or an acceleration sensor).

While the vehicle is operating in a driving assistance device activation mode or an autonomous driving mode, the vehicle's driving speed may be determined or the vehicle's steering angle may be accurately adjusted by accurately identifying the posture of vehicle.

SUMMARY

The present disclosure relates to a vehicle control apparatus and a method thereof, and more particularly, relates to a technology for identifying (or estimating) the posture of a vehicle.

Some embodiments of the present disclosure can solve the above-mentioned problems occurring in the prior art while advantages achieved by the prior art are maintained intact.

An embodiment of the present disclosure can provide a vehicle control apparatus for identifying the posture of a vehicle by using a plurality of cameras, and a method thereof.

An embodiment of the present disclosure can provide a vehicle control apparatus for providing a function of maintaining a stable posture of the vehicle in the vehicle's driving assistance mode or autonomous driving mode by identifying the posture of vehicle by using the plurality of cameras, and a method thereof.

An embodiment of the present disclosure can provide a vehicle control apparatus for accurately identifying the posture of vehicle to maintain a stable posture even though the vehicle is driving around a corner, by identifying the posture of vehicle in the vehicle's driving assistance mode or autonomous driving mode, and a method thereof.

Technical problems to be solved by embodiments of the present disclosure are not necessarily limited to the aforementioned problems, and any other technical problems not mentioned herein may be solved by an embodiment of the present disclosure, as can be clearly understood from the following description by those skilled in the art to which the present disclosure pertains.

According to an embodiment of the present disclosure, a vehicle control apparatus may include at least two cameras, a memory, and a processor. The processor may identify matching between a first image, which can be obtained by a first camera, from among images and templates stored in the memory based on obtaining the images through the at least two cameras, may obtain a first pitch angular velocity of the first camera based on matching the first image and at least one of the templates, may obtain a second pitch angular velocity of a second camera based on at least one of a line included in a second image, which can be obtained by the second camera, from among the images, or a vanishing point of the second image, or any combination thereof, and may identify a posture of a vehicle by using one of the first pitch angular velocity or the second pitch angular velocity based on a difference between the first pitch angular velocity and the second pitch angular velocity.

According to an embodiment, the processor may identify matching between the first image and the templates based on the templates expressing a specified area within the first image.

According to an embodiment, the processor may obtain a pitch change amount of the first camera based on a vanishing point change amount of the first image, and may obtain the first pitch angular velocity of the first camera based on the pitch change amount of the first camera.

According to an embodiment, the processor may obtain a pitch angle of the first camera based on performing a first specified operation on the first pitch angular velocity, and may identify the posture of the vehicle based on the pitch angle of the first camera.

According to an embodiment, the processor may obtain a pitch angle of the second camera based on identifying coordinates of the vanishing point within the second image, may obtain the second pitch angular velocity based on performing a second specified operation on the pitch angle of the second camera, and may identify the posture of the vehicle based on the second pitch angular velocity.

According to an embodiment, the processor may identify the posture of the vehicle by using the first pitch angular velocity based on the difference between the first pitch angular velocity and the second pitch angular velocity exceeding a reference value.

According to an embodiment, the processor may identify the posture of the vehicle by using the second pitch angular velocity based on the difference between the first pitch angular velocity and the second pitch angular velocity being smaller than or equal to a reference value.

According to an embodiment, the processor may identify the posture of the vehicle based on applying a specified filter to the first pitch angular velocity and a pitch angle of the second camera.

According to an embodiment, the specified filter may include at least one of a Kalman filter, an extended Kalman filter, an Unscented Kalman filter, a Bayesian filter, or a particle filter, or any combination thereof.

According to an embodiment, the processor may identify an angle, at which an external vehicle is tilted, based on identifying the external vehicle different from the vehicle within the images, may obtain a pitch angle of the second camera based on the angle, and may obtain the second pitch angular velocity based on performing a second specified operation on the pitch angle.

According to an embodiment, the processor may identify the posture of the vehicle based on converting a first coordinate system, which is used for at least one of the first pitch angular velocity, or the second pitch angular velocity, or any combination thereof, into a second coordinate system.

According to an embodiment, the processor may identify an angle, at which an external vehicle is tilted, based on identifying the external vehicle different from the vehicle within the images, may identify a roll angle of at least one of the first camera, or the second camera, or any combination thereof, based on the angle, and may obtain a pitch angle of at least one of the first camera, or the second camera, or any combination thereof, based on the roll angle.

According to an embodiment, the processor may identify reliability of at least one of the first pitch angular velocity, or the second pitch angular velocity, or any combination thereof based on a normal distribution of at least one of the first pitch angular velocity, or the second pitch angular velocity, or any combination thereof, and may identify the posture of the vehicle based on the reliability by using one of the first pitch angular velocity or the second pitch angular velocity.

According to an embodiment of the present disclosure, a vehicle control method may include identifying, by a processor, matching between a first image, which is obtained by a first camera, from among images and templates stored in a memory based on obtaining the images through at least two cameras, obtaining a first pitch angular velocity of the first camera based on matching the first image and at least one of the templates, obtaining a second pitch angular velocity of a second camera based on at least one of a line included in a second image, which is obtained by the second camera, from among the images, or a vanishing point of the second image, or any combination thereof, and identifying a posture of a vehicle by using one of the first pitch angular velocity or the second pitch angular velocity based on a difference between the first pitch angular velocity and the second pitch angular velocity.

The vehicle control method according to an embodiment may further include identifying matching between the first image and the templates based on the templates expressing a specified area within the first image.

The vehicle control method according to an embodiment may further include obtaining a pitch change amount of the first camera based on a vanishing point change amount of the first image, and obtaining the first pitch angular velocity of the first camera based on the pitch change amount of the first camera.

The vehicle control method according to an embodiment may further include obtaining a pitch angle of the first camera based on performing a first specified operation on the first pitch angular velocity, and identifying the posture of the vehicle based on the pitch angle of the first camera.

The vehicle control method according to an embodiment may further include obtaining a pitch angle of the second camera based on identifying coordinates of the vanishing point within the second image, obtaining the second pitch angular velocity based on performing a second specified operation on the pitch angle of the second camera, and identifying the posture of the vehicle based on the second pitch angular velocity.

The vehicle control method according to an embodiment may further include identifying the posture of the vehicle by using the first pitch angular velocity based on the difference between the first pitch angular velocity and the second pitch angular velocity exceeding a reference value.

The vehicle control method according to an embodiment may further include identifying the posture of the vehicle by using the second pitch angular velocity based on the difference between the first pitch angular velocity and the second pitch angular velocity being smaller than or equal to a reference value.

BRIEF DESCRIPTION OF THE DRAWINGS

The above and other features and advantages of the present disclosure can be more apparent from the following detailed description taken in conjunction with the accompanying drawings, in which.

DETAILED DESCRIPTION OF ILLUSTRATIVE EMBODIMENTS

Figure 1:
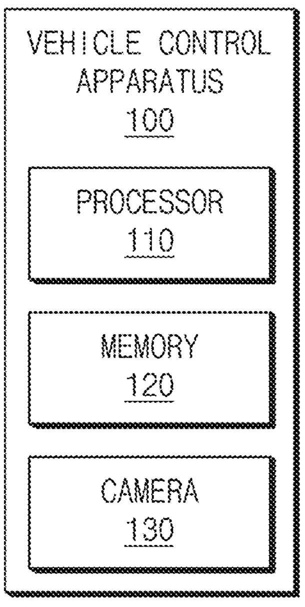
FIG. 1 shows an example of a block diagram associated with a vehicle control apparatus, according to an embodiment of the present disclosure.

Hereinafter, some example embodiments of the present disclosure will be described in detail with reference to the accompanying drawings. In adding reference numerals to components of each drawing, it can be noted that the same components include the same reference numerals, although they are indicated on another drawing. Furthermore, in the present disclosure, detailed descriptions associated with well-known functions or configurations can be omitted if they may make subject matters of the present disclosure unnecessarily obscure.

In describing elements of an embodiment of the present disclosure, the terms “first”, “second”, “A”, “B”, “(a)”, “(b)”, and the like, may be used herein. Such terms can be used to distinguish one element from another element, but do not necessarily limit the corresponding elements irrespective of the nature, order, or priority of the corresponding elements. Furthermore, unless otherwise defined, terms including technical and scientific terms used herein can be interpreted as is customary in the art to which the present disclosure belongs. It can be understood that terms used herein can be interpreted as including a meaning that is consistent with their meaning in the context of the present disclosure and the relevant art and will not be interpreted in an idealized or overly formal sense unless expressly so defined herein.

Hereinafter, various example embodiments of the present disclosure will be described in detail with reference to FIGS. 1 to 11.

FIG. 1 shows an example of a block diagram associated with a vehicle control apparatus, according to an embodiment of the present disclosure.

Referring to FIG. 1, a vehicle control apparatus 100 according to an embodiment of the present disclosure may be implemented inside or outside a vehicle, and some of components included in the vehicle control apparatus 100 may be implemented inside or outside the vehicle. The vehicle control apparatus 100 may be integrated with internal control units of a vehicle and may be implemented with a separate device so as to be coupled with control units of the vehicle by use of a separate connection means. For example, the vehicle control apparatus 100 may further include components not shown in FIG. 1.

Referring to FIG. 1, a vehicle control apparatus 100 according to an embodiment may include a processor 110, a memory 120, and a camera 130, any combination of or all of which may be in plural or may include plural components thereof. For example, the vehicle control apparatus 100 may include at least two cameras. The processor 110, the memory 120, or the camera 130 may be electrically and/or operably coupled with each other by an electronic component including a communication bus.

Hereinafter, pieces of hardware being coupled operably may include a direct and/or indirect connection between the pieces of hardware being established by wired and/or wirelessly such that second hardware is controlled by first hardware among the pieces of hardware.

Although different blocks are shown, an embodiment is not limited thereto. For example, some of the pieces of hardware in FIG. 1 may be included in a single integrated circuit including a system on a chip (SoC). The type and/or number of hardware included in the vehicle control apparatus 100 is not limited to that shown in FIG. 1. For example, the vehicle control apparatus 100 may include only some of the pieces of hardware shown in FIG. 1.

The vehicle control apparatus 100 according to an embodiment may include hardware for processing data based on one or more instructions. The hardware for processing data may include the processor 110. For example, the hardware for processing data may include at least one of an arithmetic and logic unit (ALU), a floating point unit (FPU), a field programmable gate array (FPGA), a central processing unit (CPU), or an application processor (AP), or any combination thereof. The processor 110 may include a structure of a single-core processor, or may include a structure of a multi-core processor including a dual core, a quad core, a hexa core, or an octa core. The processor 110 may include one or more processors, together or separated.

The memory 120 of the vehicle control apparatus 100 according to an embodiment may include a hardware component for storing data and/or instructions that are to be input and/or output to the processor 110 of the vehicle control apparatus 100.

For example, the memory 120 (storage medium) may include a volatile memory including a random-access memory (RAM), or a non-volatile memory including a read-only memory (ROM).

For example, the volatile memory may include at least one of a dynamic RAM (DRAM), a static RAM (SRAM), a cache RAM, or a pseudo SRAM (PSRAM), or any combination thereof.

For example, the non-volatile memory includes at least one of a programmable ROM (PROM), an erasable PROM (EPROM), an electrically erasable PROM (EEPROM), a flash memory, a hard disk, a compact disk, a solid state drive (SSD), or an embedded multi-media card (eMMC), or any combination thereof.

The camera 130 included in the vehicle control apparatus 100 according to an embodiment may include one or more optical sensors (e.g., a charged coupled device (CCD) sensor and/or a complementary metal oxide semiconductor (CMOS) sensor) that generate electrical signals indicating the color and/or brightness of light. A plurality of optical sensors included in the camera 130 may be arranged in a form of a 2-dimensional array. Each optical sensor can be considered a camera, even if combined in a same housing with other optical sensors.

The camera 130 may obtain electrical signals from a plurality of optical sensors substantially simultaneously and may generate images and/or frames, each of which correspond to light reaching the 2-dimensional array of optical sensors and each of which include a plurality of pixels arranged in two dimensions.

For example, photo data captured by using the camera 130 may refer to a plurality of images obtained from the camera 130. For example, video data captured by using the camera 130 may mean the sequence of a plurality of images obtained from the camera 130 at a specified frame rate.

The processor 110 of the vehicle control apparatus 100 according to an embodiment may obtain images through at least two cameras. For example, the at least two cameras may include the camera 130.

For example, the processor 110 may identify the matching between a first image, which is obtained by a first camera, from among the images and templates stored in the memory 120 based on obtaining the images through the at least two cameras. For example, the templates stored in the memory 120 may include a template obtained by dividing an image corresponding to the previous frame through grids.

According to an embodiment, the processor 110 may obtain a first pitch angular velocity of the first camera based on matching the first image and at least one of templates.

For example, a pitch may mean rotating about a y-axis among an x-axis corresponding to an optical axis of the camera 130, a y-axis perpendicular to the x-axis and parallel to the ground, and a z-axis perpendicular to the x-axis and perpendicular to the ground.

For example, a yaw may mean rotating about the x-axis among the x-axis corresponding to the optical axis of the camera 130, the y-axis perpendicular to the x-axis and parallel to the ground, and the z-axis perpendicular to the x-axis and perpendicular to the ground.

For example, a roll may mean rotating about a z-axis among the x-axis corresponding to the optical axis of the camera 130, the y-axis perpendicular to the x-axis and parallel to the ground, and the z-axis perpendicular to the x-axis and perpendicular to the ground.

According to an embodiment, the processor 110 may obtain a second image based on a second camera different from the first camera. For example, the processor 110 may identify at least one of a line included in a second image, which is obtained by the second camera, from among images, or a vanishing point of the second image, or any combination thereof.

For example, the processor 110 may obtain a second pitch angular velocity of the second camera based on at least one of the line included in the second image, which is obtained by the second camera, from among images, or the vanishing point of the second image, or any combination thereof.

According to an embodiment, the processor 110 may identify a difference between the first pitch angular velocity and the second pitch angular velocity. For example, the processor 110 may identify a posture of a vehicle by using either the first pitch angular velocity or the second pitch angular velocity based on the difference between the first pitch angular velocity and the second pitch angular velocity. For example, the posture of the vehicle may mean an angle at which the vehicle is tilted. For example, the identifying of the posture of the vehicle based on the difference between the first pitch angular velocity and the second pitch angular velocity may include fusing two pieces of data by using a conditional statement.

According to an embodiment, the processor 110 may identify matching between the first image and templates, based on templates expressing a specified area within the first image. For example, the specified area may include an area around the vanishing point of the first image.

For example, the processor 110 may identify a vanishing point change amount based on the matching templates and the first image. For example, the processor 110 may estimate the vanishing point change amount based on the matching templates and the first image.

For example, the processor 110 may identify the vanishing point change amount of each of the first image corresponding to a first frame, and a third image different from the first image corresponding to a second frame, based on the matching templates and the first image.

For example, the processor 110 may perform a first specified operation on the first pitch angular velocity of the first camera. For example, the first specified operation may include an integral operation.

For example, the processor 110 may identify the vanishing point of the first image. For example, the processor 110 may obtain the vanishing point change amount of the first image. For example, the processor 110 may identify the vanishing point of the first image, and the vanishing point of a fourth image obtained at a time point before the first image is obtained. The processor 110 may identify a location of the vanishing point of the first image and a location of the vanishing point of the fourth image. The processor 110 may obtain the vanishing point change amount of the first image based on a difference between the location of the vanishing point of the first image and the location of the vanishing point of the fourth image. For example, the processor 110 may obtain the pitch change amount of the first camera based on the change amount of the vanishing point of the first image.

According to an embodiment, the processor 110 may obtain the first pitch angular velocity of the first camera based on the pitch change amount of the first camera.

According to an embodiment, the processor 110 may obtain a second image by a second camera. For example, the processor 110 may identify the vanishing point within the second image. The processor 110 may identify the coordinates of the vanishing point within the second image. For example, the coordinates of the vanishing point may include the coordinate of the pixel corresponding to the vanishing point among the coordinates of each pixel identified based on the set origin point after one of vertices forming the second image is set as an origin point.

For example, the processor 110 may obtain a pitch angle of the second camera based on identifying the coordinates of the vanishing point within the second image. For example, the processor 110 may apply a second specified operation to a pitch angle of the second camera. For example, the second specified operation may include a differential operation. For example, the processor 110 may obtain a second pitch angular velocity based on performing the second specified operation on a pitch angle of the second camera.

According to an embodiment, the processor 110 may identify the posture of the vehicle based on the second pitch angular velocity.

According to an embodiment, the processor 110 may identify a difference between the first pitch angular velocity and the second pitch angular velocity. For example, the processor 110 may determine whether a difference between the first pitch angular velocity and the second pitch angular velocity exceeds a reference value.

According to an embodiment, the processor 110 may identify the posture of the vehicle by using the first pitch angular velocity based on the difference between the first pitch angular velocity and the second pitch angular velocity exceeding the reference value.

According to an embodiment, the processor 110 may identify the posture of the vehicle by using the second pitch angular velocity based on the difference between the first pitch angular velocity and the second pitch angular velocity being smaller than or equal to the reference value.

According to an embodiment, the processor 110 may apply a specified filter to the first pitch angular velocity and the pitch angle of the second camera. For example, the processor 110 may identify the posture of the vehicle based on applying a specified filter to the first pitch angular velocity and the pitch angle of the second camera. According to an embodiment, the processor 110 may estimate the posture of the vehicle based on applying a specified filter to the first pitch angular velocity and the pitch angle of the second camera.

For example, the specified filter may include at least one of a Kalman filter, an Extended Kalman filter, an Unscented Kalman filter, a Bayesian filter, or a particle filter, or any combination thereof. However, the specified filter is not limited to the examples described above.

According to an embodiment, the processor 110 may identify an external vehicle different from the vehicle within images. For example, the processor 110 may identify an angle, at which the external vehicle is tilted, based on identifying the external vehicle different from the vehicle within the images. For example, the angle at which the external vehicle is tilted may include the angle formed between a bounding box including the external vehicle and one of line segments forming an image. For example, the angle at which the external vehicle is tilted may correspond to a roll angle.

According to an embodiment, the processor 110 may obtain the pitch angle of the second camera based on the angle at which the external vehicle is tilted. The processor 110 may obtain a second pitch angular velocity based on performing the second specified operation on a pitch angle of the second camera.

According to an embodiment, the processor 110 may convert a first coordinate system, which is used for at least one of a first pitch angular velocity, or a second pitch angular velocity, or any combination thereof, into a second coordinate system. For example, the first coordinate system may include a camera coordinate system used by a camera. For example, the second coordinate system may include a vehicle coordinate system used in a vehicle.

According to an embodiment, the processor 110 may identify the posture of the vehicle based on converting the first coordinate system, which is used for at least one of a first pitch angular velocity, or a second pitch angular velocity, or any combination thereof, into the second coordinate system.

According to an embodiment, the processor 110 may identify an external vehicle different from the vehicle within images. The processor 110 may identify the angle, at which the external vehicle is tilted, within the images. For example, the processor 110 may identify an angle, at which the external vehicle is tilted, based on identifying the external vehicle different from the vehicle within the images.

According to an embodiment, the processor 110 may identify a roll angle of at least one of a first camera, or a second camera, or any combination thereof, based on the angle at which the external vehicle is tilted. For example, the processor 110 may obtain a pitch angle of at least one of the first camera, or the second camera, or any combination thereof based on a roll angle of at least one of the first camera, or the second camera, or any combination thereof. For example, the processor 110 may identify the posture of the vehicle based on obtaining the pitch angle of at least one of the first camera, or the second camera, or any combination thereof.

According to an embodiment, the processor 110 may identify the reliability of at least one of the first pitch angular velocity, or the second pitch angular velocity, or any combination thereof based on at least one normal distribution of the first pitch angular velocity, or the second pitch angular velocity, or any combination thereof. For example, the processor 110 may identify the posture of the vehicle by using either the first pitch angular velocity or the second pitch angular velocity based on the reliability of at least one of the first pitch angular velocity, or the second pitch angular velocity, or any combination thereof.

Among contents described above, the obtaining of the first pitch angular velocity based on identifying the matching of the first image and templates may be referred to as template matching-vehicle dynamic compensation (TM-VDC). Moreover, the obtaining of the second pitch angular velocity based on at least one of the line included in the second image, or the vanishing point of the second image, or any combination thereof may be referred to as lane inference-vehicle dynamic compensation (LI-VDC).

For example, the TM-VDC may include a function for identifying the posture of vehicle without requiring parallel lines. For example, the LI-VDC may include a function of estimating accurate vanishing points.

As mentioned above, the processor 110 of the vehicle control apparatus 100 according to an embodiment may identify the posture of the vehicle based on at least one of the first pitch angular velocity, or the second pitch angular velocity, or any combination thereof. The processor 110 may relatively accurately identify the posture of the vehicle by identifying the posture of the vehicle based on at least one of the first pitch angular velocity, or the second pitch angular velocity, or any combination thereof.

Figure 2:
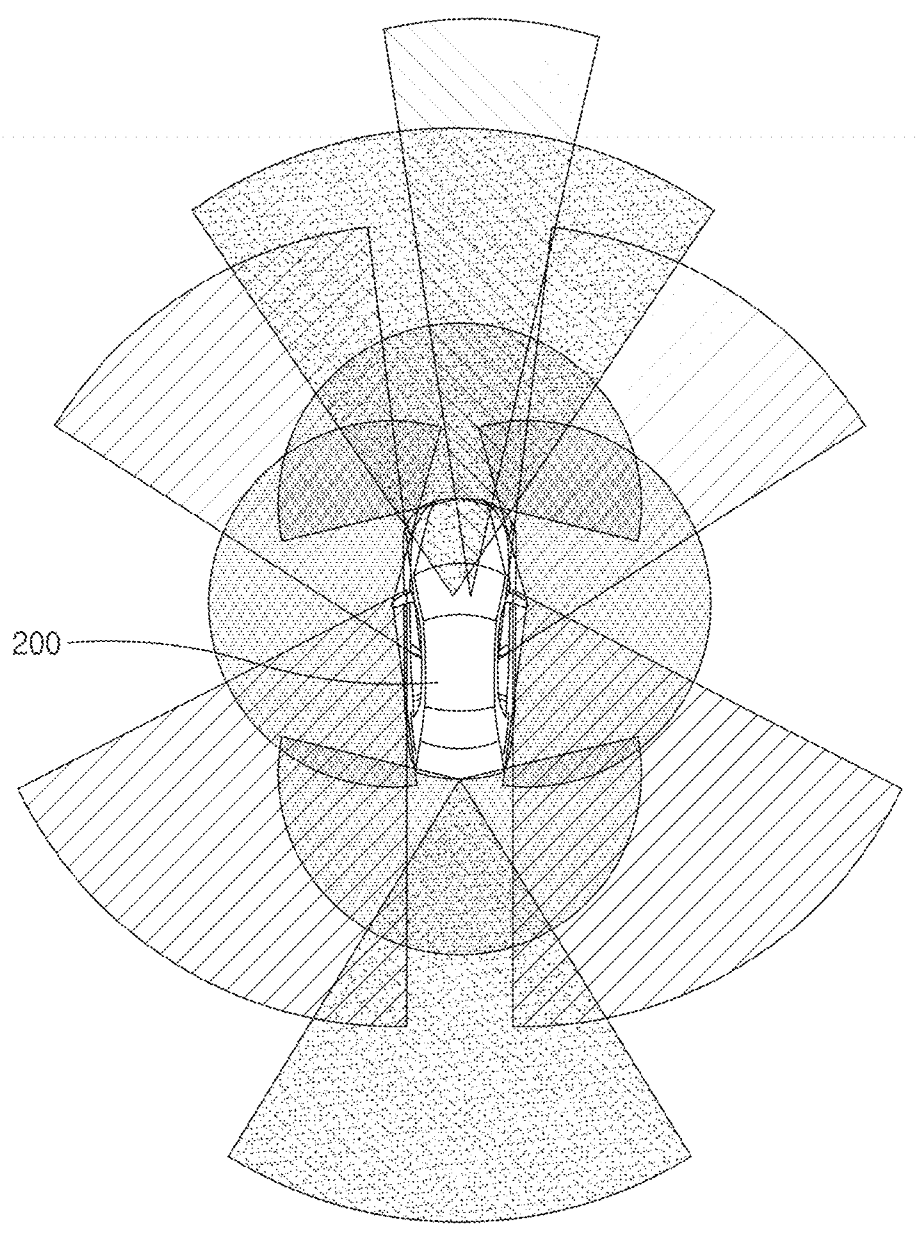
FIG. 2 shows an example of dividing areas detected by cameras, according to an embodiment of the present disclosure.

FIG. 2 shows an example of dividing areas detected by a camera, according to an embodiment of the present disclosure.

Referring to FIG. 2, a processor (e.g., the processor 110 in FIG. 1) of a vehicle control apparatus (e.g., the vehicle control apparatus 100 of FIG. 1) according to an embodiment may obtain images through cameras (e.g., the camera 130 in FIG. 1).

For example, the processor may obtain a first image representing a first area 211 through a first camera among the cameras. For example, the processor may obtain a second image representing a second area 213 through a second camera among the cameras. For example, the processor may obtain a third image representing a third area 215 through a third camera among the cameras. For example, the processor may obtain a fourth image representing a fourth area 217 through a fourth camera among the cameras.

According to an embodiment, the processor may identify (or estimate) the posture of a vehicle 200 based on images respectively obtained through the cameras.

For example, the processor may obtain at least one of a pitch angular velocity of the first camera, or a pitch angle of the first camera, or any combination thereof based on the first image obtained through the first camera.

For example, the processor may identify the posture of the vehicle 200 based on at least one of the first pitch angular velocity of the first camera, or the first pitch angle of the first camera, or any combination thereof.

For example, the processor may obtain first data expressing the posture of the vehicle 200 based on fusing the first pitch angular velocity and the first pitch angle.

For example, the processor may obtain at least one of the second pitch angular velocity of the second camera, or the second pitch angle of the second camera, or any combination thereof based on the second image obtained through the second camera.

For example, the processor may identify the posture of the vehicle 200 based on at least one of the second pitch angular velocity of the second camera, or the second pitch angle of the second camera, or any combination thereof.

For example, the processor may obtain second data expressing the posture of the vehicle 200 based on fusing the second pitch angular velocity and the second pitch angle.

For example, the processor may obtain at least one of the third pitch angular velocity of the third camera, or the third pitch angle of the third camera, or any combination thereof based on the third image obtained through the third camera.

For example, the processor may identify the posture of the vehicle 200 based on at least one of the third pitch angular velocity of the third camera, or the third pitch angle of the third camera, or any combination thereof.

For example, the processor may obtain third data expressing the posture of the vehicle 200 based on fusing the third pitch angular velocity and the third pitch angle.

For example, the processor may obtain at least one of the fourth pitch angular velocity of the fourth camera, or the fourth pitch angle of the fourth camera, or any combination thereof, based on the fourth image obtained through the fourth camera.

For example, the processor may identify the posture of the vehicle 200 based on at least one of the fourth pitch angular velocity of the fourth camera, or the fourth pitch angle of the fourth camera, or any combination thereof.

For example, the processor may obtain fourth data expressing the posture of the vehicle 200 based on fusing the fourth pitch angular velocity and the fourth pitch angle.

According to an embodiment, the processor may obtain at least one of the first data, the second data, the third data, or the fourth data, or any combination thereof.

For example, the processor may fuse at least one of the first data, the second data, the third data, or the fourth data, or any combination thereof.

For example, the processor may compensate for the vehicle's dynamics based on the fusion of at least one of the first data, the second data, the third data, or the fourth data, or any combination thereof.

For example, the processor may compensate for the camera's geometry based on the compensation for the vehicle's dynamics. For example, an operation of compensating for the geometry of a camera may include an operation of correcting an error generated by using a plurality of cameras.

According to an embodiment, the processor may identify the final posture of the vehicle 200 based on the compensation for the geometry of the camera.

As described above, the processor of the vehicle control apparatus according to an embodiment may relatively accurately identify the posture of the vehicle 200 by identifying the final posture of the vehicle 200 based on at least one of the first data, the second data, the third data, or the fourth data, or any combination thereof.

Figure 3:
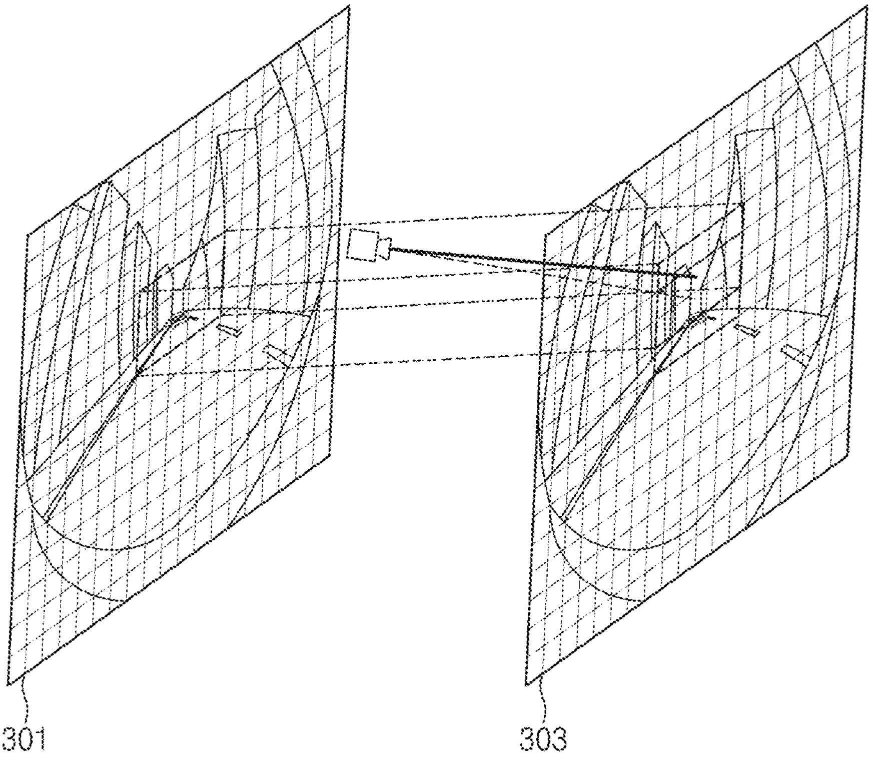
FIG. 3 shows an example of identifying matching between a first image and templates, according to an embodiment of the present disclosure.

FIG. 3 shows an example of identifying matching between a first image and templates, according to an embodiment of the present disclosure.

Referring to FIG. 3, a first example 301 may include a template expressing a frame of a first time point. A second example 303 may include an image obtained at a second time point after the first time point.

For example, a processor (e.g., the processor 110 in FIG. 1) of a vehicle control apparatus (e.g., the vehicle control apparatus 100 of FIG. 1) may identify the matching between a template representing the frame of the first time point and the image obtained at the second time point.

For example, the processor may divide the template representing the frame of the first time point into grids. For example, the processor may divide the image obtained at the second time point into grids. For example, the processor may divide the template representing the frame of the first time point and the image obtained at the second time point into grids with equal spacing.

For example, the processor may identify the matching between the image, which is obtained at the second time point and which is divided based on grids, and the template, which represents the frame of the first time point and which is divided based on grids. For example, the processor may identify the matching of grids in a specified area. For example, the processor may identify the matching between a first specified area of the template representing the frame of the first time point and a second specified area of the image obtained at the second time point.

The processor may identify at least one of the pitch angular velocity, or the pitch angle, or any combination thereof of the camera obtaining the image of the second time point, based on the fact that the first specified area of the template expressing the frame of the first time point is the same as the second specified area of the image obtained at the second time point.

Figure 4:
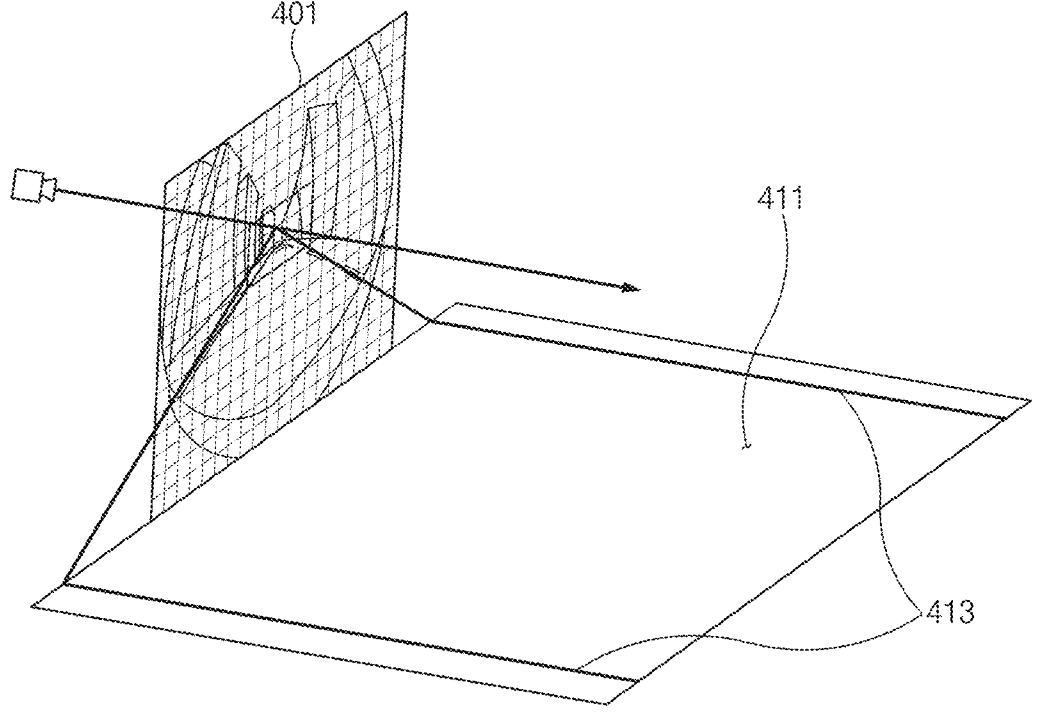
FIG. 4 shows an example of identifying a line, according to an embodiment of the present disclosure.

FIG. 4 shows an example of identifying a line, according to an embodiment of the present disclosure.

Referring to FIG. 4, a processor (e.g., the processor 110 in FIG. 1) of a vehicle control apparatus (e.g., the vehicle control apparatus 100 of FIG. 1) according to an embodiment may obtain an image 401 through a camera (e.g., the camera 130 in FIG. 1).

For example, the processor may identify at least one of a ground 411, or a line 413, or any combination thereof, based on obtained the image 401.

For example, the processor may identify a vanishing point within the image 401 based on identifying at least one of the ground 411, or the line 413, or any combination thereof, within the image 401. For example, the line 413 may be parallel to each other.

For example, the processor may estimate an optical axis of a camera obtaining the image 401 based on at least one of the ground 411, or the line 413, or any combination thereof. For example, the processor may identify the vanishing point within the image 401 based on estimating the optical axis of the camera obtaining the image 401.

According to an embodiment, the processor may obtain at least one of a pitch angular velocity, or a pitch angle, or any combination thereof of the camera obtaining the image 401 based on identifying the vanishing point in the image 401. The processor may identify the posture of vehicle based on at least one of the pitch angular velocity, or the pitch angle, or any combination thereof of the camera obtaining the image 401.

Figure 5:
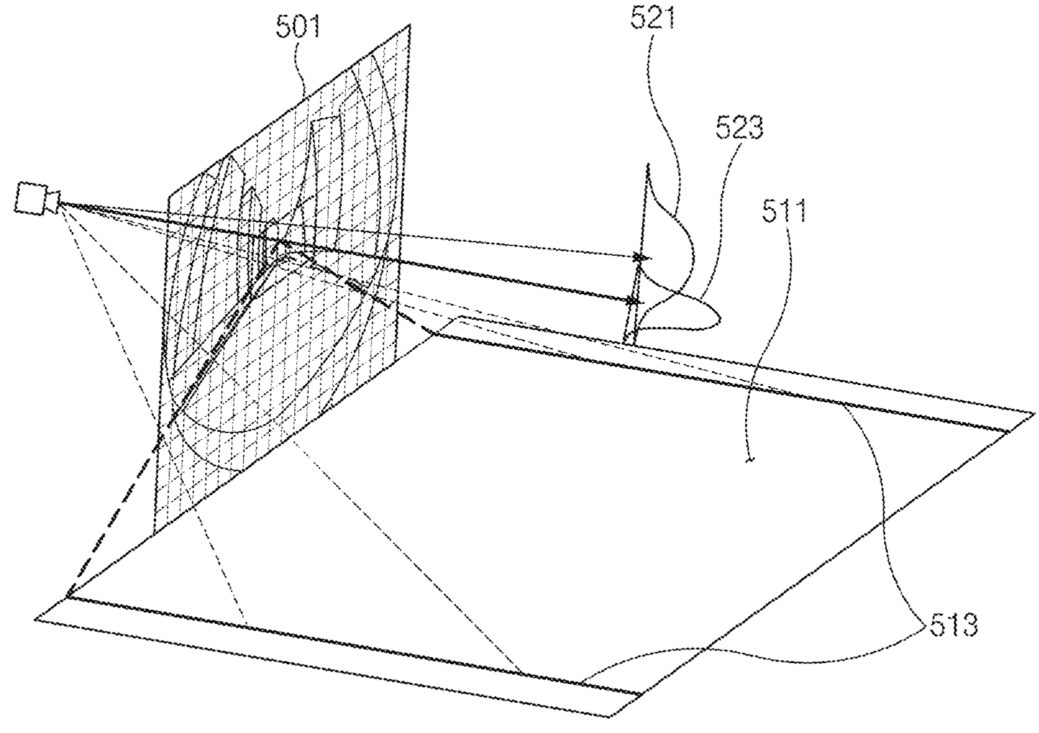
FIG. 5 shows an example associated with reliability of a pitch angular velocity and a pitch angle, according to an embodiment of the present disclosure.

FIG. 5 shows an example associated with reliability of a pitch angular velocity and a pitch angle, according to an embodiment of the present disclosure.

Referring to FIG. 5, a processor (e.g., the processor 110 in FIG. 1) of a vehicle control apparatus (e.g., the vehicle control apparatus 100 of FIG. 1) according to an embodiment may obtain an image 501 through a camera (e.g., the camera 130 in FIG. 1).

According to an embodiment, the processor may perform template matching on the image 501. For example, the template matching may include determining whether a template representing a frame of a first time point matches an image obtained at a second time point. For example, the processor may obtain a first pitch angular velocity based on the template matching on the image 501.

According to an embodiment, the processor may obtain a pitch angle based on identifying the vanishing point of the image 501. For example, the processor may obtain a second pitch angular velocity by performing a specified operation on a pitch angle based on obtaining the pitch angle. For example, the specified operation performed on the pitch angle may include a differential operation.

According to an embodiment, the processor may obtain a first normal distribution 521 of the first pitch angular velocity. The processor may obtain a second normal distribution 523 of a second pitch angular velocity. For example, the first normal distribution 521 and/or the second normal distribution 523 may refer to respective reliability. For example, as the normal distribution is smaller, the reliability may be greater. For example, the normal distribution may include at least one of a variance, or a mean, or any combination thereof. For example, the mean may be associated with a location of the vanishing point. For example, the variance may be the extent, to which the normal distribution is spread. As the variance is higher, the reliability may be lower.

According to an embodiment, the processor may apply a specified filter to the first pitch angular velocity and the second pitch angular velocity. For example, the specified filter may include a Kalman filter. For example, the first normal distribution 521 of the first pitch angular velocity and the second normal distribution 523 of the second pitch angular velocity may be associated with a weight applied to the Kalman filter.

For example, the processor may identify first reliability based on the first normal distribution 521. For example, the processor may identify second reliability based on the second normal distribution 523.

For example, if the Kalman filter is applied to the first pitch angular velocity and the second pitch angular velocity, the weight may be applied based on the first reliability and the second reliability. For example, as the reliability is higher, the greater weight may be applied. As the reliability is lower, the smaller weight may be applied.

According to an embodiment, the processor may identify a posture of vehicle based on applying the specified filter to the first pitch angular velocity and the second pitch angular velocity.

Figure 6:
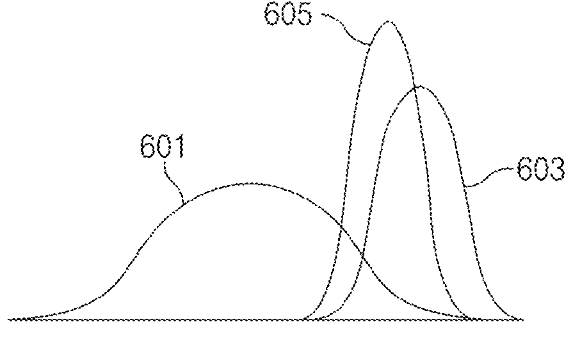
FIG. 6 shows an example for identifying a posture of a vehicle using a pitch angle, according to an embodiment of the present disclosure.

FIG. 6 shows an example for identifying a posture of a vehicle using a pitch angle, according to an embodiment of the present disclosure.

Referring to FIG. 6, a processor (e.g., the processor 110 in FIG. 1) of a vehicle control apparatus (e.g., the vehicle control apparatus 100 of FIG. 1) according to an embodiment may obtain a first image through a first camera among at least two cameras. The processor may obtain a second image through a second camera among the at least two cameras.

For example, the processor may obtain a first pitch angular velocity of the first camera based on identifying the matching of the first image and templates. For example, the processor may perform a specified operation on a first pitch angular velocity. For example, the specified operation performed on the first pitch angular velocity may include an integral operation. The processor may obtain a first pitch angle corresponding to the first pitch angular velocity based on performing the specified operation on the first pitch angular velocity.

According to an embodiment, the processor may identify the vanishing point of the second image. The processor may obtain a second pitch angle of the second camera based on identifying the vanishing point of the second image.

According to an embodiment, the processor may obtain a first normal distribution 601 associated with the first pitch angle. The processor may obtain a second normal distribution 603 associated with the second pitch angle.

According to an embodiment, the processor may estimate the posture of the vehicle based on the first normal distribution 601 associated with the first pitch angle and the second normal distribution 603 associated with the second pitch angle.

For example, the processor may express the posture of vehicle as a third normal distribution 605. For example, the processor may obtain the third normal distribution 605 associated with the posture of vehicle based on at least one of the first pitch angle, the second pitch angle, the first normal distribution 601 associated with the first pitch angle, or the second normal distribution 603 associated with the second pitch angle, or any combination thereof. The processor may estimate the posture of the vehicle based on the third normal distribution 605 associated with the posture of the vehicle.

Figure 7A:
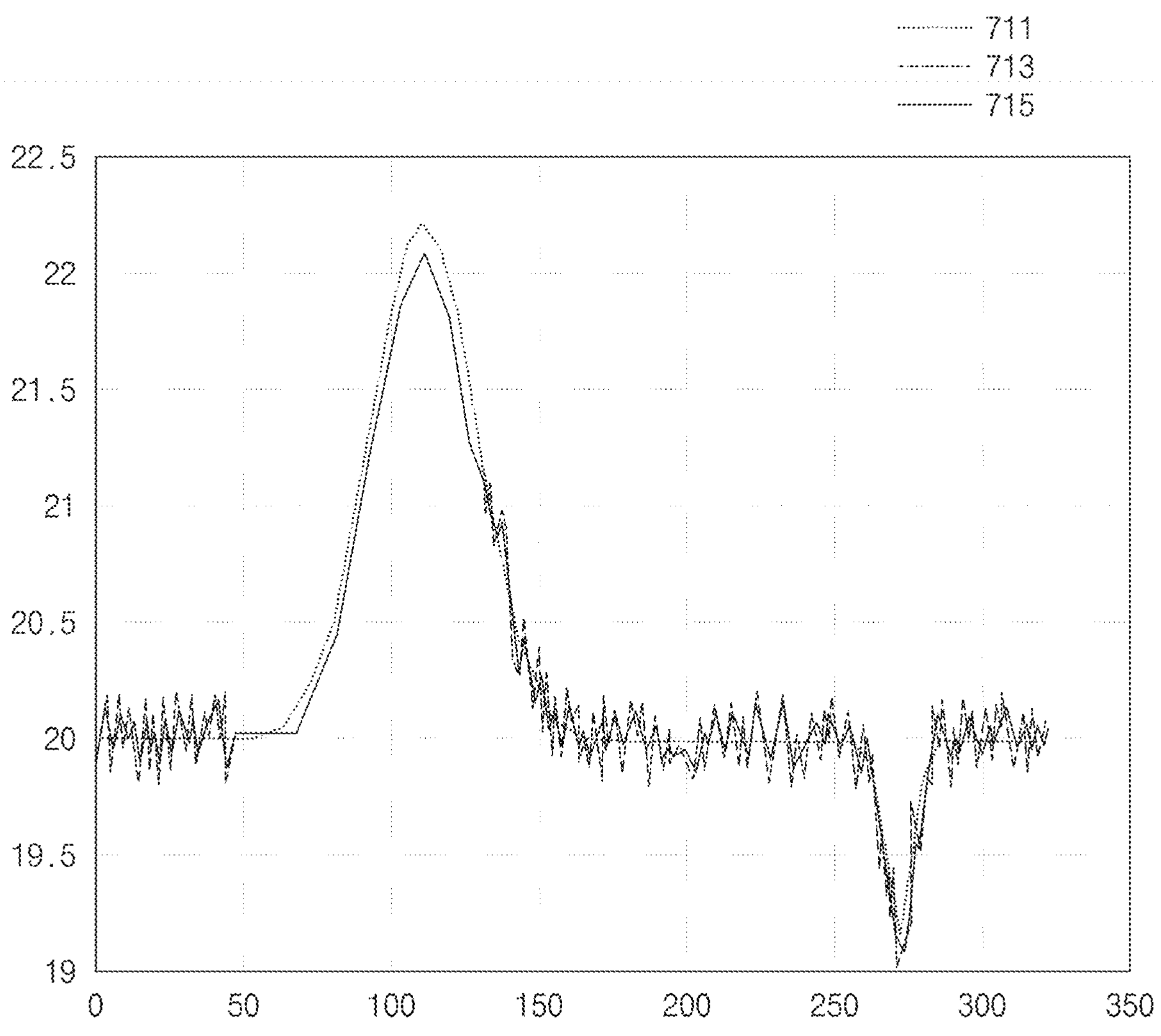
FIGS. 7A and 7B show an example of the result of applying an embodiment of the present disclosure.
Figure 7B:
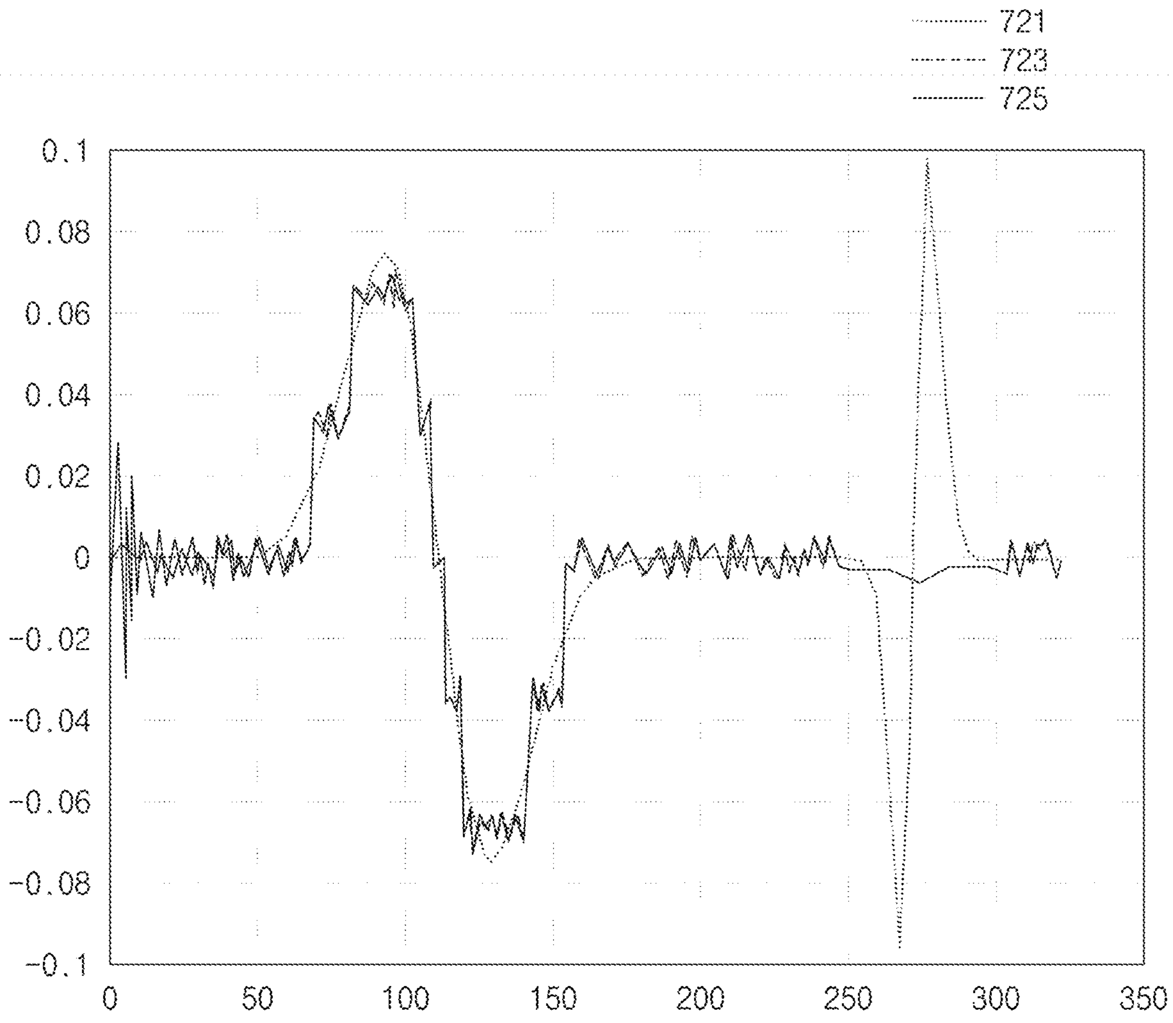

FIGS. 7A and 7B show an example of the result of applying the present disclosure.

FIG. 7A may include an example of a graph associated with a pitch angle. FIG. 7B may include an example of a graph associated with a pitch angular velocity.

The y-axis of the graph shown in FIG. 7A may indicate a pitch angle. The x-axis of the graph shown in FIG. 7A may indicate a frame.

The y-axis of the graph shown in FIG. 7B may indicate a pitch angular velocity. The x-axis of the graph shown in FIG. 7B may indicate a frame.

A first line 711 of FIG. 7A may include ground truth (GT) indicating a ground-truth value. A second line 713 in FIG. 7A may include a pitch angle before a Kalman filter is applied. A third line 715 of FIG. 7A may include a pitch angle output by applying the Kalman filter.

A first line 721 of FIG. 7B may include GT indicating a ground-truth value. A second line 723 in FIG. 7B may include a pitch angular velocity before the Kalman filter is applied. A third line 725 of FIG. 7B may include a pitch angular velocity output by applying the Kalman filter.

In FIGS. 7A and 7B, it may be seen that the pitch angle output by applying the Kalman filter and/or the pitch angular velocity output by applying the Kalman filter are relatively closer to GT, which is the ground-truth value.

Figure 8:
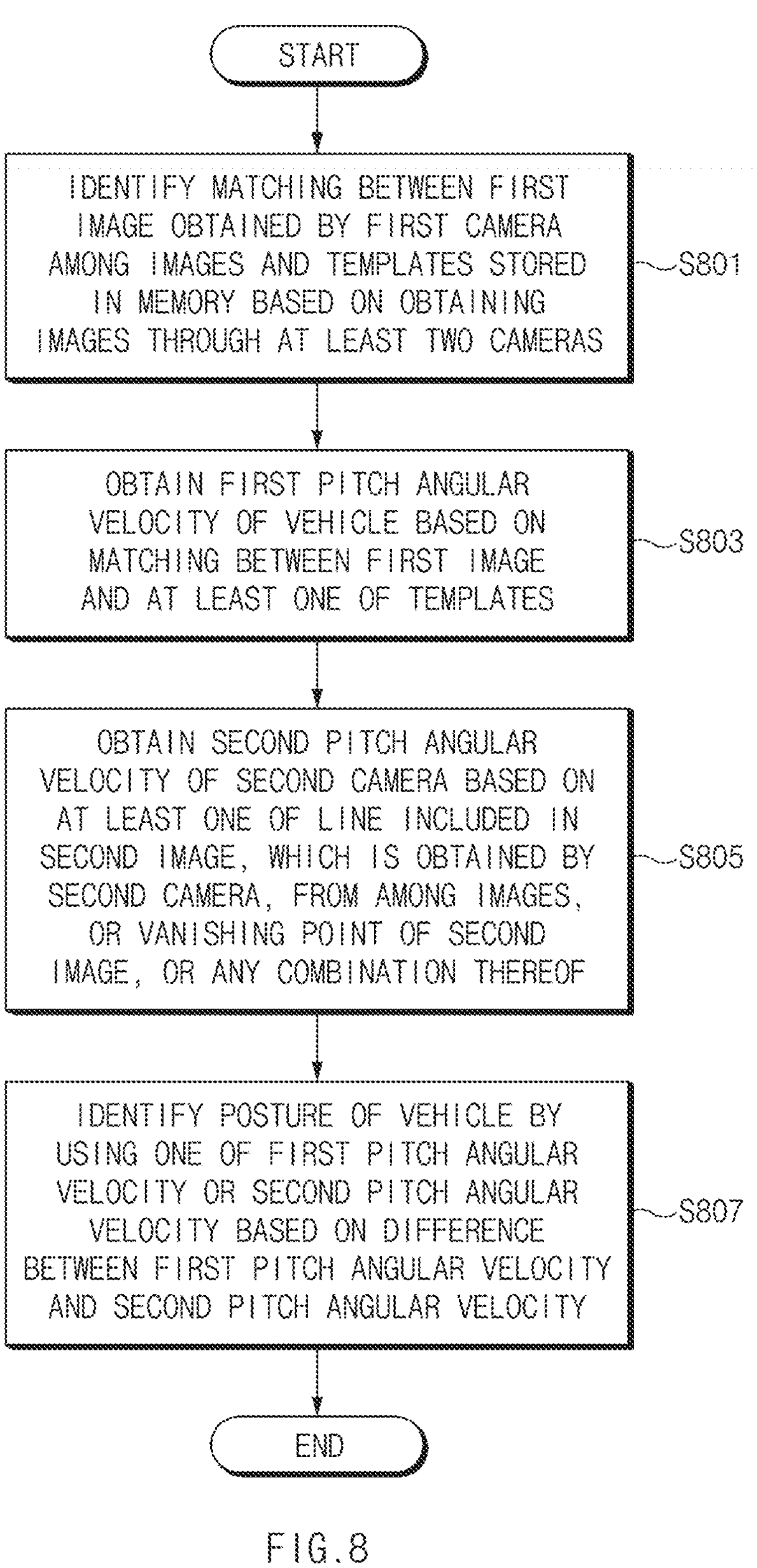
FIG. 8 shows an example of a flowchart associated with a vehicle control method, according to an embodiment of the present disclosure.

FIG. 8 shows an example of a flowchart associated with a vehicle control method, according to an embodiment of the present disclosure.

Hereinafter, as an example, it can be assumed that the vehicle control apparatus 100 of FIG. 1 performs the process of FIG. 8. In addition, in a description of FIG. 8, it may be understood that an operation described as being performed by an apparatus can be controlled by the processor 110 of the vehicle control apparatus 100.

At least one of operations of FIG. 8 may be performed by the vehicle control apparatus 100 of FIG. 1. Each of the operations in FIG. 8 may be performed sequentially, but is not necessarily sequentially performed. For example, the order of operations may be changed, and at least two operations may be performed in parallel.

Referring to FIG. 8, in operation S801, a vehicle control method according to an embodiment may include an operation of identifying matching between a first image obtained by a first camera among images and templates stored in a memory, based on obtaining images through at least two cameras.

The vehicle control method according to an embodiment may include an operation of identifying the matching between the first image and the templates, based on the templates expressing a specified area within a first image.

In operation S803, the vehicle control method according to an embodiment may include an operation of obtaining a first pitch angular velocity of a vehicle based on matching between the first image and at least one of the templates.

The vehicle control method according to an embodiment may include an operation of obtaining a pitch change amount of a first camera based on the vanishing point change amount of the first image. The vehicle control method may include an operation of obtaining the first pitch angular velocity of the first camera based on the pitch change amount of the first camera.

In operation S805, the vehicle control method according to an embodiment may include an operation of obtaining a second pitch angular velocity of a second camera based on at least one of a line included in the second image, which is obtained by a second camera, from among images, or a vanishing point of the second image, or any combination thereof.

The vehicle control method according to an embodiment may include an operation of obtaining a pitch angle of the second camera based on identifying the coordinates of the vanishing point within the second image. The vehicle control method according to an embodiment may include an operation of obtaining a second pitch angular velocity based on performing a second specified operation on a pitch angle of the second camera. The vehicle control method may include an operation of identifying the posture of the vehicle based on second pitch angular velocity.

The vehicle control method may include an operation of identifying an angle, at which an external vehicle is tilted, based on identifying the external vehicle different from the vehicle within the images. The vehicle control method may include an operation of obtaining the pitch angle of the second camera based on the angle at which the external vehicle is tilted. The vehicle control method according to an embodiment may include an operation of obtaining the second pitch angular velocity based on performing the second specified operation on the pitch angle.

The vehicle control method may include an operation of identifying an angle, at which the external vehicle is tilted, based on identifying the external vehicle different from the vehicle within the images. The vehicle control method according to an embodiment may include an operation of identifying a roll angle of at least one of the first camera, or the second camera, or any combination thereof, based on the angle at which the external vehicle is tilted. The vehicle control method may include an operation of obtaining the pitch angle of at least one of the first camera, or the second camera, or any combination thereof, based on the roll angle.

In operation S807, the vehicle control method according to an embodiment may include an operation of identifying the posture of the vehicle by using one of the first pitch angular velocity or the second pitch angular velocity based on a difference between the first pitch angular velocity and the second pitch angular velocity.

The vehicle control method according to an embodiment may include an operation of obtaining the pitch angle of the first camera based on performing the first specified operation on the first pitch angular velocity. The vehicle control method may include an operation of identifying the posture of the vehicle based on the pitch angle of the first camera.

The vehicle control method according to an embodiment may include an operation of identifying the posture of the vehicle by using the first pitch angular velocity based on the difference between the first pitch angular velocity and the second pitch angular velocity exceeding a reference value.

The vehicle control method according to an embodiment may include an operation of identifying the posture of the vehicle by using the second pitch angular velocity based on the difference between the first pitch angular velocity and the second pitch angular velocity being smaller than or equal to the reference value.

The vehicle control method according to an embodiment may include an operation of identifying the posture of the vehicle based on applying a specified filter to the first pitch angular velocity and the pitch angle of the second camera.

For example, the specified filter may include at least one of a Kalman filter, an Extended Kalman filter, an Unscented Kalman filter, a Bayesian filter, or a particle filter, or any combination thereof.

The vehicle control method according to an embodiment may include an operation of identifying the posture of the vehicle based on converting a first coordinate system, which is used for at least one of the first pitch angular velocity, or the second pitch angular velocity, or any combination thereof, into a second coordinate system.

Figure 9:
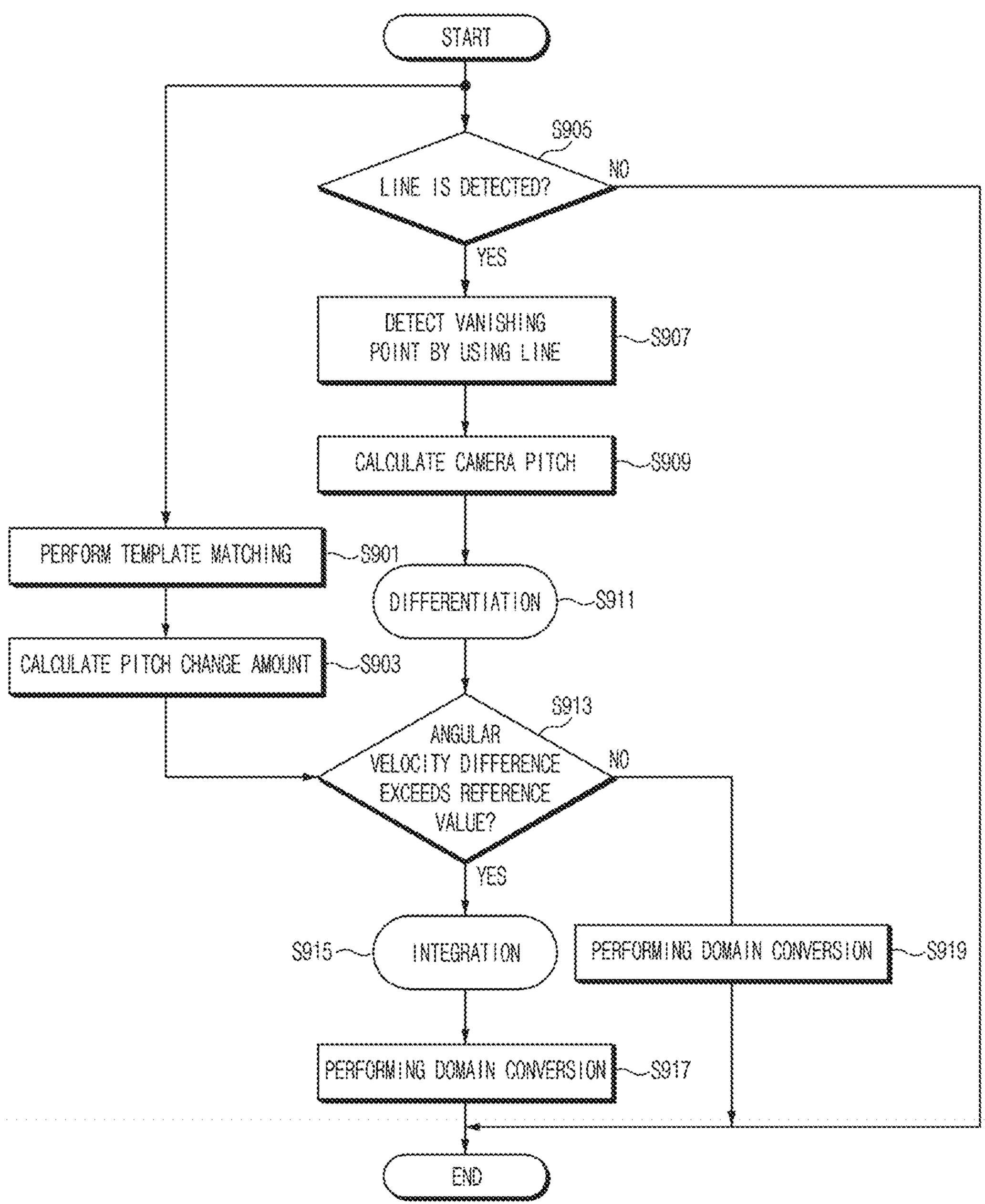
FIG. 9 shows an example of a flowchart associated with a vehicle control method, according to an embodiment of the present disclosure.

FIG. 9 shows an example of a flowchart associated with a vehicle control method, according to an embodiment of the present disclosure.

Hereinafter, as an example, it can be assumed that the vehicle control apparatus 100 of FIG. 1 performs the process of FIG. 9. In addition, in a description of FIG. 9, it may be understood that an operation described as being performed by an apparatus can be controlled by the processor 110 of the vehicle control apparatus 100.

At least one of operations of FIG. 9 may be performed by the vehicle control apparatus 100 of FIG. 1. Each of the operations in FIG. 9 may be performed sequentially, but is not necessarily sequentially performed. For example, the order of operations may be changed, and at least two operations may be performed in parallel.

Referring to FIG. 9, in operation S901, a vehicle control method according to an embodiment may include an operation of performing template matching. For example, the operation of performing the template matching may include an operation of determining whether an image at least partially matches a template.

In operation S903, the vehicle control method according to an embodiment may include calculating a pitch change amount. For example, the vehicle control method may include an operation of calculating the pitch change amount based on performing the template matching. For example, the pitch change amount may mean a pitch angular velocity of the first camera.

In operation S905, the vehicle control method according to an embodiment may include an operation of determining whether a line is detected. For example, the vehicle control method may include an operation of determining whether a line is detected within the image.

If the line is detected (Yes at operation S905), in operation S907, the vehicle control method according to an embodiment may include an operation of detecting a vanishing point by using a line. For example, the vehicle control method may include detecting the vanishing point based on the line identified within the image. For example, the vehicle control method may include identifying the coordinates of the vanishing point based on a line identified within the image.

If the line is not detected (No at operation S905), the vehicle control method according to an embodiment may not perform an operation of detecting the vanishing point by using the line. For example, the vehicle control method may include an operation of terminating the corresponding process without performing an operation of detecting a vanishing point by using a line.

In operation S909, the vehicle control method according to an embodiment may include an operation of calculating a camera pitch. For example, the camera pitch may include the pitch angle of the second camera. Accordingly, the vehicle control method may include identifying the pitch angle of the second camera in operation S909.

In operation S911, the vehicle control method according to an embodiment may include an operation of performing a differential operation based on calculating the camera pitch. For example, the vehicle control method may include an operation of performing the differential operation on the camera pitch (or a pitch angle of the second camera). The vehicle control method may include an operation of obtaining a second pitch angular velocity based on performing the differential operation on the camera pitch. For example, the vehicle control method may include an operation of obtaining a second pitch angular velocity based on performing a differential operation on the pitch angle of the second camera.

In operation S913, the vehicle control method according to an embodiment may include an operation of determining whether the angular velocity difference exceeds the reference value. For example, the vehicle control method may include an operation of determining whether a difference between the first pitch angular velocity and the second pitch angular velocity exceeds the reference value.

If the angular velocity difference exceeds the reference value (Yes at operation S913), in operation S915, the vehicle control method according to an embodiment may include an operation of performing an integral operation. For example, the vehicle control method may include performing the integral operation on the first pitch angular velocity based on the difference between the first pitch angular velocity and the second pitch angular velocity exceeding the reference value. For example, if the difference between the first pitch angular velocity and the second pitch angular velocity exceeds the reference value, the vehicle control method may include an operation of obtaining a pitch angle corresponding to the first pitch angular velocity based on performing an integral operation on the first pitch angular velocity.

In operation S917, the vehicle control method according to an embodiment may include an operation of performing domain conversion. For example, the vehicle control method may include an operation of converting a first coordinate system to a second coordinate system. For example, the vehicle control method may include an operation of converting a camera coordinate system included in the first coordinate system to a vehicle coordinate system included in the second coordinate system. For example, the vehicle control method may include an operation of converting the first coordinate system, in which the pitch angle corresponding to the first pitch angular velocity is expressed, to the second coordinate system.

If the angular velocity difference does not exceed the reference value (No at operation S913), in operation S919, the vehicle control method according to an embodiment may include an operation of performing domain conversion. For example, the vehicle control method may include an operation of converting a camera coordinate system included in the first coordinate system to a vehicle coordinate system included in the second coordinate system. For example, the vehicle control method may include an operation of converting the first coordinate system, in which the pitch angle corresponding to the second pitch angular velocity is expressed, to the second coordinate system.

Figure 10:
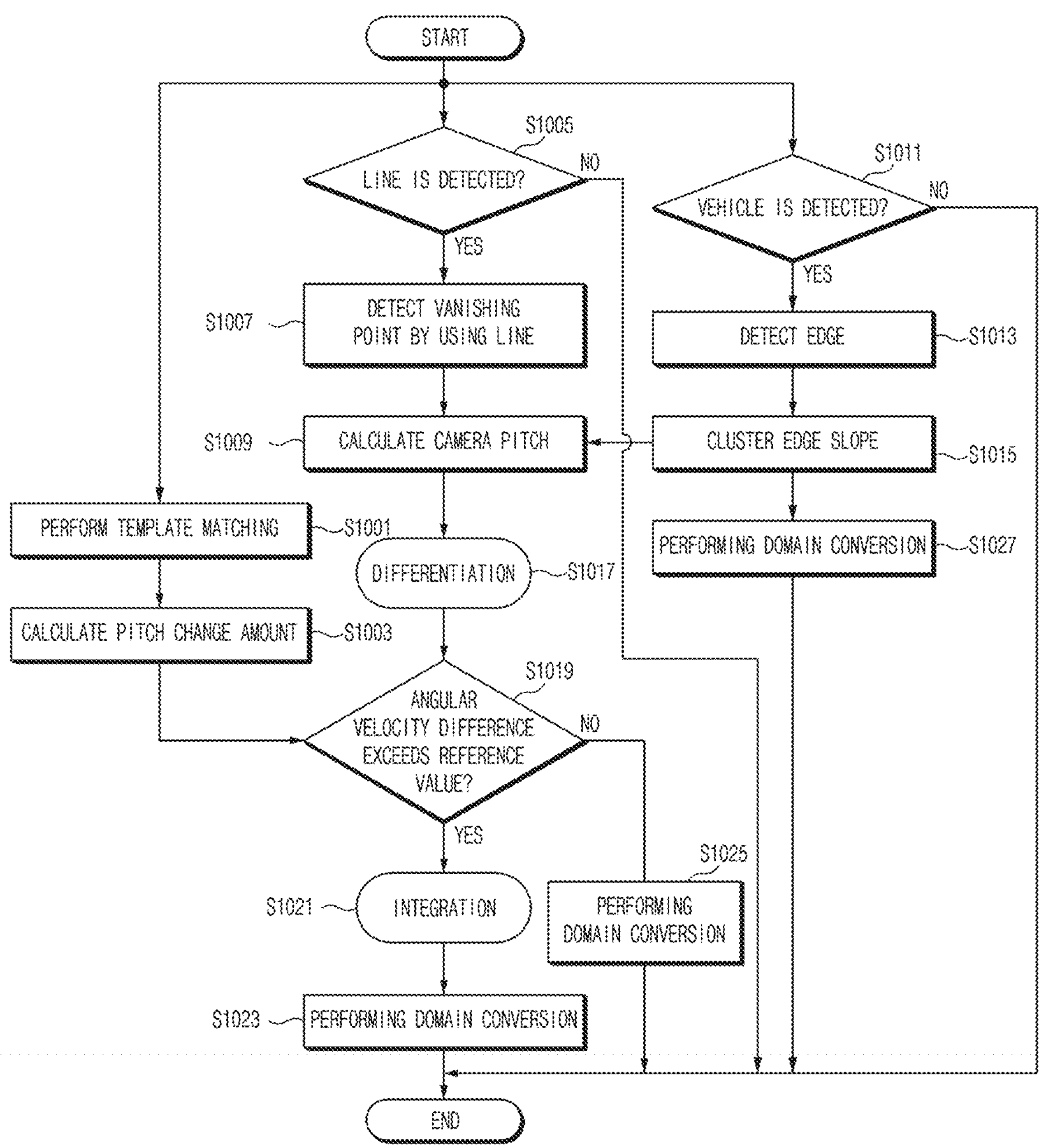
FIG. 10 shows an example of a flowchart associated with a vehicle control method, according to an embodiment of the present disclosure.

FIG. 10 shows an example of a flowchart associated with a vehicle control method, according to an embodiment of the present disclosure.

Hereinafter, as an example, it can be assumed that the vehicle control apparatus 100 of FIG. 1 performs the process of FIG. 10. In addition, in a description of FIG. 10, it may be understood that an operation described as being performed by an apparatus can be controlled by the processor 110 of the vehicle control apparatus 100.

At least one of operations of FIG. 10 may be performed by the vehicle control apparatus 100 of FIG. 1. Each of the operations in FIG. 10 may be performed sequentially, but is not necessarily sequentially performed. For example, the order of operations may be changed, and at least two operations may be performed in parallel.

Referring to FIG. 10, in operation S1001, a vehicle control method according to an embodiment may include an operation of performing template matching. Operation S1001 may include operation S901 of FIG. 9.

In operation S1003, the vehicle control method according to an embodiment may include calculating a pitch change amount. Operation S1003 may include operation S903 of FIG. 9.

In operation S1005, the vehicle control method according to an embodiment may include an operation of determining whether a line is detected. Operation S1005 may include operation S905 of FIG. 9.

In operation S1007, the vehicle control method according to an embodiment may include an operation of detecting a vanishing point by using a line. Operation S1007 may include operation S907 of FIG. 9.

In operation S1009, the vehicle control method according to an embodiment may include an operation of calculating a camera pitch. Operation S1009 may include operation S909 of FIG. 9.

For example, the vehicle control method may include an operation of calculating a camera pitch based on the vanishing point and a roll angle of the camera obtained in operation S1015.

In operation S1011, the vehicle control method according to an embodiment may include an operation of determining whether a vehicle is detected. For example, the vehicle control method may include an operation of determining whether a vehicle is detected within the image.

If the vehicle is detected (Yes at operation S1011), in operation S1013, the vehicle control method according to an embodiment may include an operation of detecting an edge. For example, the vehicle control method may include an operation of detecting the edge including a vehicle in an image.

In operation S1015, the vehicle control method according to an embodiment may include an operation of clustering an edge slope. For example, the vehicle control method may include an operation of identifying a roll angle of a camera based on clustering the edge slope.

In operation S1017, the vehicle control method according to an embodiment may include an operation of performing a differential operation. For example, the vehicle control method may include an operation of performing a differential operation on the camera pitch. For example, operation S1017 may include operation S911 of FIG. 9.

In operation S1019, the vehicle control method according to an embodiment may include an operation of determining whether the angular velocity difference exceeds a reference value. For example, operation S1019 may include operation S913 of FIG. 9.

If the angular velocity difference exceeds the reference value (Yes at operation S1019), in operation S1021, the vehicle control method according to an embodiment may include an operation of performing an integral operation. For example, operation S1021 may include operation S915 of FIG. 9.

In operation S1023, the vehicle control method according to an embodiment may include an operation of performing domain conversion. For example, operation S1023 may include operation S917 of FIG. 9.

If the angular velocity difference does not exceed the reference value (No at operation S1019), in operation S1025, the vehicle control method according to an embodiment may include an operation of performing domain conversion. For example, operation S1025 may include operation S919 of FIG. 9.

In operation S1027, the vehicle control method according to an embodiment may include an operation of performing domain conversion. For example, operation S1027 may be substantially the same as at least one of operation S1023, or operation S1025, or any combination thereof.

Figure 11:
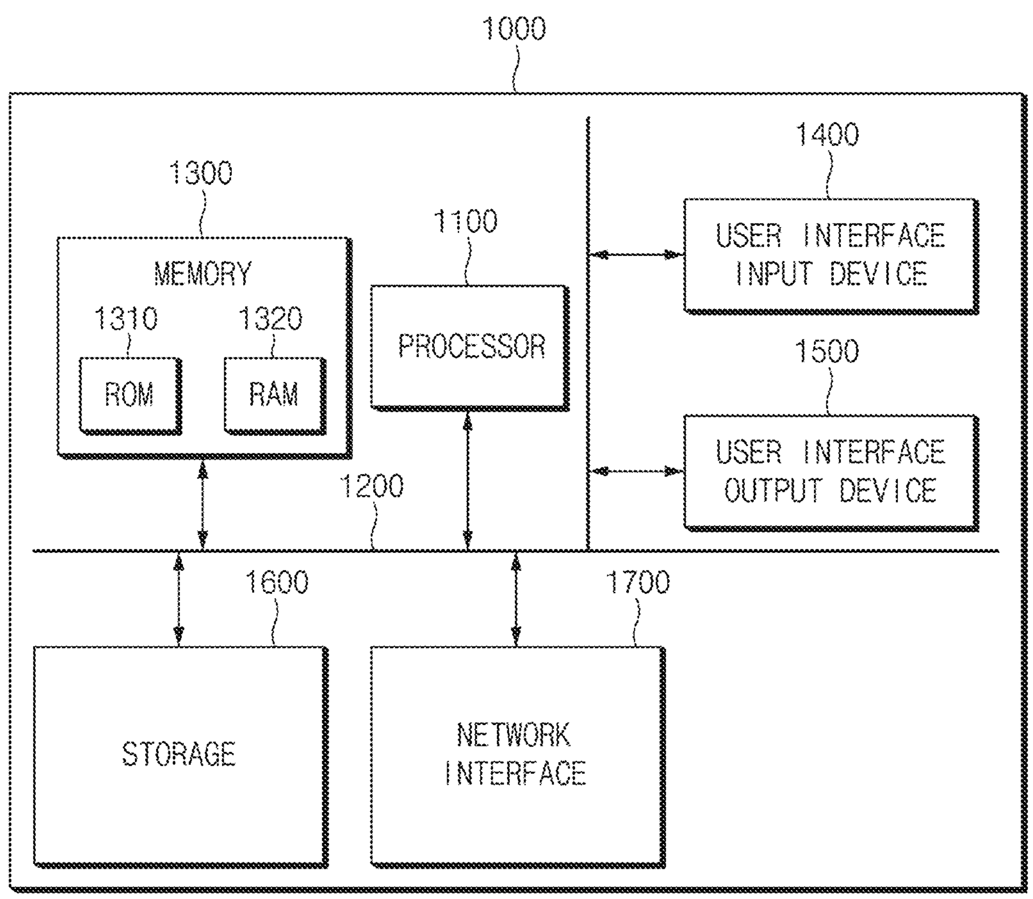
FIG. 11 shows a computing system related to a vehicle control apparatus or vehicle control method, according to an embodiment of the present disclosure.

FIG. 11 shows a computing system related to a vehicle control apparatus or vehicle control method, according to an embodiment of the present disclosure.

Referring to FIG. 11, a computing system 1000 may include at least one processor 1100, a memory 1300, a user interface input device 1400, a user interface output device 1500, storage 1600, and a network interface 1700, which are connected with each other via a bus 1200, any combination of or all of which may be in plural or may include plural components thereof.

The processor 1100 may be a central processing device (CPU) or a semiconductor device that processes instructions stored in a storage medium, such as the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The example storage medium is coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor 1100 and the storage medium may reside in the user terminal as an individual component.

Hereinabove, although the present disclosure has been described with reference to example embodiments and the accompanying drawings, the present disclosure is not limited thereto, but may be variously modified and altered by those skilled in the art to which the present disclosure pertains without departing from the spirit and scopes of the present disclosure claimed in the following claims.

Therefore, the example embodiments of the present disclosure are provided to explain the spirit and scopes of the present disclosure, but not to necessarily limit them, so that the spirit and scopes of the present disclosure are not necessarily limited by the example embodiments. The scopes of the present disclosure can be construed on the basis of the accompanying claims, and technical ideas within scopes equivalent to the claims can be included in the scopes of the present disclosure.

An embodiment of the present disclosure may identify a posture of a vehicle by using a plurality of cameras.

An embodiment of the present disclosure may provide a function of maintaining a stable posture of the vehicle in the vehicle's driving assistance mode or autonomous driving mode by identifying the posture of vehicle by using the plurality of cameras.

An embodiment of the present disclosure may accurately identify the posture of vehicle to maintain a stable posture even though the vehicle is driving around a corner, by identifying the posture of vehicle in the vehicle's driving assistance mode or autonomous driving mode.

Hereinabove, although the present disclosure was described with reference to example embodiments and the accompanying drawings, the present disclosure is not necessarily limited thereto, but may be variously modified and altered by those skilled in the art to which the present disclosure pertains without departing from the spirit and scopes of the present disclosure claimed in the following claims.

What is claimed is:

1. A vehicle control apparatus comprising:

a group of cameras on a vehicle, the group of cameras including a first camera and a second camera;

one or more processors; and a non-transitory storage medium storing computer-readable instructions that, when executed by the one or more processors, enable the one or more processors to:

identify matching between a first image, which is obtained by the first camera, from among an image set and templates stored in the storage medium based on obtaining the image set through the group of cameras, obtain a first pitch angular velocity of the first camera based on matching the first image and at least one of the templates, obtain a second pitch angular velocity of the second camera based on one of or both of a line included in a second image, the second image being obtained by the second camera, from among the image set, and a vanishing point of the second image, and identify a posture of the vehicle by using one of the first pitch angular velocity or the second pitch angular velocity based on a difference between the first pitch angular velocity and the second pitch angular velocity.

2. The apparatus of claim 1, wherein the instructions further enable the one or more processors to identify matching between the first image and the templates based on the templates expressing a specified area within the first image.

3. The apparatus of claim 1, wherein the instructions further enable the one or more processors to:

obtain a pitch change amount of the first camera based on a vanishing point change amount of the first image; and obtain the first pitch angular velocity of the first camera based on the pitch change amount of the first camera.

4. The apparatus of claim 1, wherein the instructions further enable the one or more processors to:

obtain a pitch angle of the first camera based on performing a first specified operation on the first pitch angular velocity; and identify the posture of the vehicle based on the pitch angle of the first camera.

5. The apparatus of claim 1, wherein the instructions further enable the one or more processors to:

obtain a pitch angle of the second camera based on identifying coordinates of the vanishing point within the second image;

obtain the second pitch angular velocity based on performing a second specified operation on the pitch angle of the second camera; and identify the posture of the vehicle based on the second pitch angular velocity.

6. The apparatus of claim 1, wherein the instructions further enable the one or more processors to identify the posture of the vehicle by using the first pitch angular velocity based on the difference between the first pitch angular velocity and the second pitch angular velocity exceeding a reference value.

7. The apparatus of claim 1, wherein the instructions further enable the one or more processors to identify the posture of the vehicle by using the second pitch angular velocity based on the difference between the first pitch angular velocity and the second pitch angular velocity being smaller than or equal to a reference value.

8. The apparatus of claim 1, wherein the instructions further enable the one or more processors to identify the posture of the vehicle based on applying a specified filter to the first pitch angular velocity and a pitch angle of the second camera.

9. The apparatus of claim 8, wherein the specified filter includes at least one of or any combination of a Kalman filter, an Extended Kalman filter, an Unscented Kalman filter, a Bayesian filter, and a particle filter.

10. The apparatus of claim 1, wherein the instructions further enable the one or more processors to:

identify an external vehicle angle at which an external vehicle is tilted based on identifying the external vehicle different from the vehicle within the image set;

obtain a pitch angle of the second camera based on the external vehicle angle; and obtain the second pitch angular velocity based on performing a second specified operation on the pitch angle.

11. The apparatus of claim 1, wherein the instructions further enable the one or more processors to identify the posture of the vehicle based on converting a first coordinate system into a second coordinate system, the first coordinate system being used for one of or both of the first pitch angular velocity and the second pitch angular velocity.

12. The apparatus of claim 1, wherein the instructions further enable the one or more processors to:

identify an external vehicle angle at which an external vehicle is tilted based on identifying the external vehicle different from the vehicle within the image set;

identify a roll angle of one of or both of the first camera and the second camera, based on the external vehicle angle; and obtain a pitch angle of one of or both of the first camera and the second camera, based on the roll angle.

13. The apparatus of claim 1, wherein the instructions further enable the one or more processors to:

identify reliability of one of or both of the first pitch angular velocity and the second pitch angular velocity, based on a normal distribution of one of or both of the first pitch angular velocity and the second pitch angular velocity; and identify the posture of the vehicle based on the reliability by using one of the first pitch angular velocity or the second pitch angular velocity.

14. A vehicle control method, the method comprising:

identifying matching between a first image, the first image being obtained by a first camera, from among an image set and templates based on obtaining the image set through at least two cameras;

obtaining a first pitch angular velocity of the first camera based on matching the first image and at least one of the templates;

obtaining a second pitch angular velocity of a second camera based on one of or both of a line included in a second image, the second image being obtained by the second camera, from among the image set, and a vanishing point of the second image; and identifying a posture of a vehicle by using one of the first pitch angular velocity or the second pitch angular velocity, based on a difference between the first pitch angular velocity and the second pitch angular velocity.

15. The method of claim 14, further comprising identifying matching between the first image and the templates based on the templates expressing a specified area within the first image.

16. The method of claim 14, further comprising:

obtaining a pitch change amount of the first camera based on a vanishing point change amount of the first image; and obtaining the first pitch angular velocity of the first camera based on the pitch change amount of the first camera.

17. The method of claim 14, further comprising:

obtaining a pitch angle of the first camera based on performing a first specified operation on the first pitch angular velocity; and identifying the posture of the vehicle based on the pitch angle of the first camera.

18. The method of claim 14, further comprising:

obtaining a pitch angle of the second camera based on identifying coordinates of the vanishing point within the second image;

obtaining the second pitch angular velocity based on performing a second specified operation on the pitch angle of the second camera; and identifying the posture of the vehicle based on the second pitch angular velocity.

19. The method of claim 14, further comprising identifying the posture of the vehicle by using the first pitch angular velocity based on the difference between the first pitch angular velocity and the second pitch angular velocity exceeding a reference value.

20. The method of claim 14, further comprising identifying the posture of the vehicle by using the second pitch angular velocity based on the difference between the first pitch angular velocity and the second pitch angular velocity being smaller than or equal to a reference value.

* * * * *